Dec. 14, 1926.
W. J. HENRY
1,610,517
SYSTEM OF FITTING GLASSES AND APPARATUS FOR USE IN PRACTICING THE SAME
Filed August 25, 1925
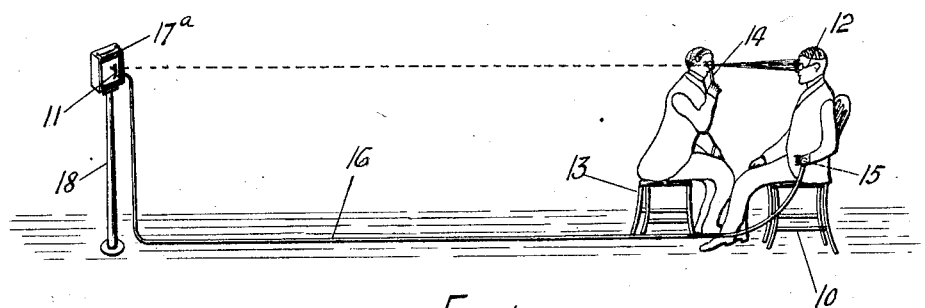
Fig.-1.
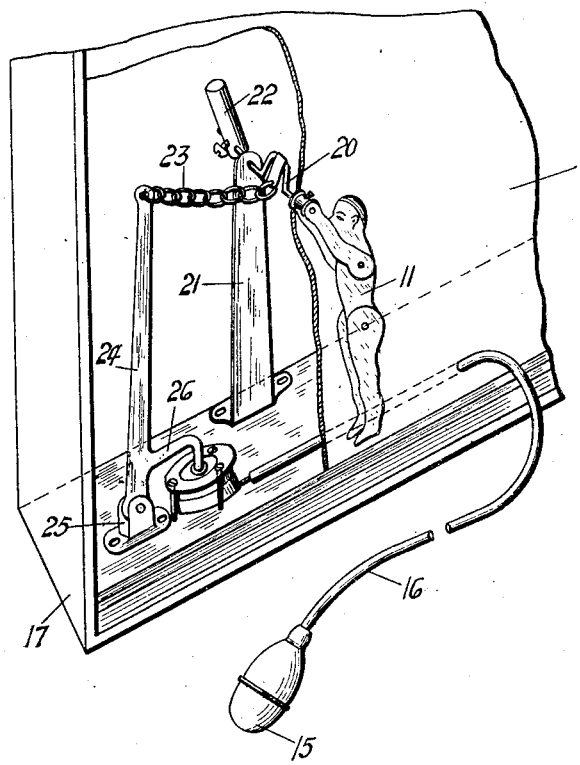
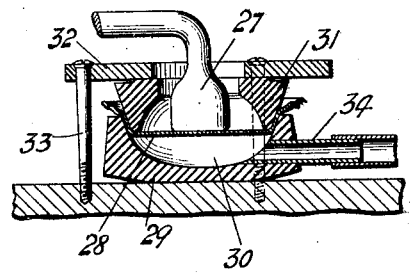
Fig.-3.
INVENTOR.
WILLIAM J. HENRY.
BY
ATTORNEY.

Patented Dec. 14, 1926.

1,610,517

UNITED STATES PATENT OFFICE.

WILLIAM J. HENRY, OF AKRON, OHIO.

SYSTEM OF FITTING GLASSES AND APPARATUS FOR USE IN PRACTICING THE SAME.

Application filed August 25, 1925. Serial No. 52,295.

This invention relates to a system or procedure for fitting glasses to give clear and comfortable vision without the aid of drugs, and it also relates to a device for use in practicing the system.

In the fitting of glasses, it is essential that the muscles of the eye be in a state of relaxation while the error is being measured, so that the fitted glasses will make the proper correction.

Heretofore, latent error has always been the great stumbling block in fitting glasses. Oculists have resorted to the use of "drops" of certain drugs which paralyze the focussing muscles so that they may be sure the muscles do not work. Among the objections to this method, there may be noted: The inconvenience to the hyperoptic patient making the distant vision poorer and close vision impossible for several days. Then there is always danger of permanent injury. And lastly, there is the necessary guess element in such an examination, since a paralyzed muscle is far from being a resting or relaxed muscle, and one cannot accurately estimate the amount of variation between a paralyzed and resting muscle, the amount varying greatly in different people.

Optometrists often resort to suppression (or repression) glasses to relax the eye muscles. The chief objections to this method are: the necessary expense of several pair of glasses; the inconvenience to the patients of blurred distant vision and total abstinence from all close work during treatment, besides the necessity of several eye examinations.

The chief object of the present invention is to devise a system whereby all the eye muscles, both inside and outside, are placed in that so much to be desired position of perfect rest and are held in such positions while the eyes of the patient are refracted with suitable optical instruments, such as the retinoscope.

In order to produce the above result, the present inventor has discovered that the principle that one's brain cannot voluntarily cause separate sets of muscles to function simultaneously may be applied in such a way as to induce complete natural rest or relaxation of the eye muscles, and also to bring about a steadiness of the eyes facilitating the measurement of the error. In other words, the present inventor has discovered that if the patient's mind can be freed of any thought of vision, natural relaxation results.

To apply the above principle, it is merely necessary to provide some arrangement whereby the patient is required to voluntarily use other sets of muscles than the eye muscles while the examination is being made, thus rendering it impossible for him to contract the eye muscles which will accordingly naturally relax. To the end that steadiness of the eyes will be obtained, it is desirable to provide an irregularly or erratically movable target at which the patient looks and to provide means whereby the patient causes the target to move by use of the muscles of the hand, foot, or other sets of muscles excepting those of the eye. Accordingly, by this simple expedient, both desirable results of relaxed eye muscles and steady eyes are induced in the patient.

It is also an object of the invention to provide a device for carrying out the system or procedure of eye examination outlined above and including an irregularly or erratically movable target adapted to be placed at a distance from the patient and having means connected thereto whereby the target is operable by the patient.

The foregoing and other objects will be better understood by referring to the accompanying drawings and the following description illustrating one mode of carrying out the invention and one apparatus adapted for use therein. It is to be understood that the invention is not limited to the specific form thereof illustrated.

Of the accompanying drawings:

Figure 1 is a perspective view illustrating one mode of practicing the invention and one apparatus for use therein;

Figure 2 is a perspective view partly broken away illustrating one form of movable target and means for moving the same; and Figure 3 is a sectional detail of a part of the target moving means.

Referring to the drawings, the patient is positioned at 10 and placed at a distance from him is an erratically movable target indicated at 11. The frame for holding various lenses before the patient's eyes in the usual manner is shown at 12. The examiner may take his position at 13 and refract the eye with the aid of a retinoscope indicated at 14 while the patient is looking at target 11 and operating the same by suitable means, such as a pneumatic bulb 15 held in the hand and connected to the target operating means, to be described, by means of a tube 16.

Any suitable movable target 11 may be provided. The apparatus here shown consists in a box frame 17 mounted on a pedestal 18 and having secured therein, a front piece 19 before which target 11 moves, the target 11 and front piece 19 preferably being respectively white and black to afford a contrast. A source of light may be mounted on the frame 17 as at 17$^a$ and directed against the target.

Target 11 may, as here shown, consist in an acrobatic figure having arms and legs pivoted to a trunk in simulation of a human figure and having the arms thereof secured to a crank shaft 20 which is journaled in front piece 19 and in a bracket 21 mounted on frame 17 behind the front piece 19. A counterpoise 22 may be secured on the back end of shaft 20 to balance the weight of the target 11.

For operating crank shaft 20, a suitable flexible connection 23 is loosely connected to the crank thereof and to a lever 24 pivoted on a bracket 25 secured on frame 17. Lever 24 has an arm 26 thereon formed with a downwardly bent end preferably having a knob 27 thereon, and normally resting on a vibratory diaphragm 28 of flexible material such as rubber. Diaphragm 28 is clamped onto the top of a vessel 29, to form an airtight expansion chamber 30, by means of an annular clamping member 31 with which is engaged an annular clamping plate 32 having screws 33, 33 extending therethrough into frame 17 to clamp diaphragm 28 in place and to secure the pneumatic operating device thus formed on frame 17.

An inlet to vessel 29 is provided at 34 and tube 16 is connected thereto, whereby alternately pressing and releasing bulb 15 will cause diaphragm 28 to vibrate and thus through arm 26 will rock lever 24 back and forth and through chain 23 will effect intermittent rotation of shaft 20 causing target 11 to move about and perform various antics.

In practicing the method with the arrangement just described, the patient at 10 is requested to look at target 11 and to keep it moving by means of bulb 15. This causes the patient's brain to concentrate on movement of the muscles of the hand and he causes the target 11 to move erratically so fast that he could not focus his eyes on the target even if he tried. Thus the muscles of the eye naturally relax and the examiner at 13 can refract it, the latent error being thus brought out and corrected. If the patient does try to focus his eyes on the target, he will involuntarily discontinue operating the target. The examiner immediately notices the contraction and requests the patient to keep the target moving.

The results secured by this system appear to be in a measure due to preventing direct vision so that the patient is made to use indirect vision.

"Direct" is that vision a person creates by looking directly at a stationary object and by voluntary muscle action focusing their eyes thereon. This action is accomplished by a contraction of the pupil which aids in sharpening the picture formed on the retina, the same as a small stop in a camera sharpens the picture. Direct vision is most successfully performed by concentrating on the thought of sharp vision. Only a very small part of the retina is used in direct vision. This part is commonly called the macular region and is about two m/m in diameter.

"Indirect" vision is taken care of by all parts of the retina outside of this macular region and is used for bulk and moving object vision and is not assisted in the least by focusing muscle action. It is accompanied by dilation of the pupil as sharp indirect vision is impossible and a large field of vision is desirable.

Direct vision (muscle action vision) is prevented by the patient's inability to successfully operate simultaneously more than one set of voluntary muscles. At the same time the patient is made to use indirect vision (moving object vision) which also calls for relaxation or inactivity of the focusing muscles.

It will appear from the foregoing that exceedingly simple, inexpensive procedure and apparatus have been devised for effectively inducing natural relaxation of the eye muscles while measuring and correcting the error of one's eyes. It will also be understood that the procedure and apparatus may both be modified in many ways without sacrificing any of the benefits of the present invention, and such modifications may be resorted to without departing from the spirit of the invention or the scope of the appended claims.

What is claimed is:

1. A method for ascertaining the errors of refraction in a patient's eyes, comprising inducing natural relaxation of the eye muscles by requiring the patient to voluntarily use other sets of muscles in operation of a movable target and requiring him to look at said target, and measuring the error while the eye muscles are so relaxed.

2. Apparatus for the purpose described, comprising a patient's station, an erratically movable target upon which the patient's eye cannot focus while moving, said target being spaced from the patient's station and being visible therefrom, and means operable by the patient from his station for moving the target.

3. Apparatus for the purpose described, comprising a patient's station, an erratically movable target mounted so as to be visible from said station, and means at the station adapted to be voluntarily operated by the patient for moving the target by exercise of other than the eye muscles to induce a state of complete relaxation of the eye muscles.

WILLIAM J. HENRY.